United States Patent
Lee et al.

(10) Patent No.: US 7,593,728 B2
(45) Date of Patent: Sep. 22, 2009

(54) PRIVATE WIRELESS COMMUNICATION SYSTEM AND METHOD FOR CONTROLLING MOBILE STATION USING THE SAME

(75) Inventors: Joo-Hong Lee, Suwon-si (KR); Doo-Yong Yang, Seoul (KR); Soo-Hwan Kim, Anyang-si (KR); Geun-Myeon Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 447 days.

(21) Appl. No.: 11/347,243

(22) Filed: Feb. 6, 2006

(65) Prior Publication Data

US 2006/0178146 A1    Aug. 10, 2006

(30) Foreign Application Priority Data

Feb. 7, 2005  (KR) ...................... 10-2005-0011433
Jun. 8, 2005  (KR) ...................... 10-2005-0049040

(51) Int. Cl.
*H04Q 7/20* (2006.01)
(52) U.S. Cl. .................................... 455/435.1; 455/436
(58) Field of Classification Search ........................ None
See application file for complete search history.

(56) References Cited

U.S. PATENT DOCUMENTS

| 2003/0144015 | A1* | 7/2003 | Ham ........................ 455/466 |
| 2004/0048624 | A1 | 3/2004 | Ko |
| 2004/0147255 | A1* | 7/2004 | Lee ......................... 455/422.1 |
| 2004/0228460 | A1 | 11/2004 | Keramane |
| 2006/0019664 | A1* | 1/2006 | Nelakanti et al. ........... 455/436 |

FOREIGN PATENT DOCUMENTS

| KR | 10-2000-0028172 | 5/2000 |
| KR | 10-2004-0065467 | 7/2004 |

OTHER PUBLICATIONS

Korean Office Action for Korean Patent Application Nos. 2005-49040 issued on Aug. 23, 2006.
Office Action from the Chinese Patent Office issued in Applicant's corresponding Chinese Patent Application No. 200610006825.x dated Jun. 6, 2008.

* cited by examiner

*Primary Examiner*—Lester Kincaid
*Assistant Examiner*—Phuoc Doan
(74) *Attorney, Agent, or Firm*—Robert E. Bushnell, Esq.

(57) ABSTRACT

In a private wireless communication system and a mobile station (MS) control method using the same, the system informs an MS of its entrance into a private network using a system parameter message broadcast through a paging channel in order to control additional functions of the MS (e.g., a camera function, a MP3 player function, and a USB data communication function), and the MS transmits a registration message to the private wireless communication system through an access channel. The system determines whether the MS is registered in the private network based on the registration message from the MS, and if the MS is registered in the private network, controls the functions of the MS by writing a message for MS function control based on MS control information set in a database, and by and transmitting the MS function control message to the MS. After the system requests an acknowledgment message from the MS, if the acknowledgment message is not received from the MS, the private wireless communication system rewrites and retransmits the MS function control message to the MS.

25 Claims, 9 Drawing Sheets

PRIVATE WIRELESS COMMUNICATION SYSTEM AND METHOD FOR CONTROLLING MOBILE STATION USING THE SAME

CLAIM OF PRIORITY

This application makes reference to and claims all benefits accruing under 35 U.S.C. § 119 from an application for PRIVATE WIRELESS COMMUNICATION SYSTEM AND METHOD FOR CONTROLLING MOBILE STATION USING THE SAME earlier filed in the Korean Intellectual Property Office on Feb. 07, 2005 and on Jun. 08, 2005, and there duly assigned Ser. No. 2005-0011433 and Ser. No. 2005-0049040.

BACKGROUND OF THE INVENTION

1. Technical Field

The present invention relates to a private wireless communication system and a method of controlling mobile stations using the same. More particularly, when a mobile station registered in a private wireless communication system enters a service area of the private wireless communication system, the system and method control additional functions of the mobile station, such as a camera function, an MP3 player function and a universal serial bus (USB) data communication function, and additionally manage security information occurring during and as a result of the control processing of the mobile station, thereby improving reliability with respect to security management, as well as affording convenience to an operator of the mobile station.

2. Related Art

As a solution to the problem of providing a free voice communication and a data service in an in-building office environment, a new system has been realized by applying CDMA-RF technology to a private wired-wireless switching center.

Herein, the meaning of "private wireless network" is not limited to an office environment, such as buildings, but is also applicable to a communication environment in a specific zone or area (e.g., a campus and barracks).

An example of such a system realized by connecting a private wired-wireless network to a mobile public network is disclosed in Korean Patent Application Ser. No. 10-2000-0028172 (Patent No. 10-0365790) SYSTEM AND METHOD FOR PROVIDING PUBLIC/PRIVATE MOBILE COMMUNICATION SERVICE, which will not be described in detail but which is incorporated in its entirety herein by reference. This system, with the public network connected with the private wired-wireless network, can provide various services to subscribers. A subscriber can be provided with a communication service no matter where he/she is moving in a building, and a hand-off service when he/she moves out of a private zone. Moreover, when an Intranet is constructed, the subscriber can search for necessary in-house information from outside.

Most mobile stations are of a multi-function type having various, excellent functions, such as a camera function. While these functions are very convenient for users, in practice, they act as a severe threat to the security of companies or national organizations that need information security. Moreover, in public places such as a theater, a concert site or a conference hall, these functions act as a factor that may cause noise or may adversely influence the progress of an event.

In order to compensate for these problems, a public network can have frequency (FA) control over mobile stations in a specific site. However, this is difficult to carry out since it may adversely influence mobile stations of other users in a boundary area between BTSs located in the mobile public network and the private wireless network.

Furthermore, if a mobile station enters a service zone of a private wireless communication system in a specific site or inside a specific building, including a conventional private wireless communication system, a supervisor has to examine the mobile stations to determine whether they are mounted with a specific unit, such as a camera, an MP3 player, a recorder, a multimedia data communication unit (e.g., a USB data communication unit), and so on, and has to disable the stations from running such a unit or prevent them from being carried in.

In public places, such as a theatre, a concert site, a lecture room or a conference hall, there is another problem in that a supervisor has to examine all functions of mobile stations, and thus has to request users to disable or lock corresponding functions of the mobile stations.

As a result, this has caused problems that result in inconvenience to users entering the service area of the private wireless communication system with their mobile stations, as well as to supervisors of the service area. That is, the conventional private wireless communication system has not possessed a process flow for controlling and managing the above-described functions of a mobile station that enter the service area.

SUMMARY OF THE INVENTION

The present invention has been developed to solve the foregoing problems, and it is therefore an object of the present invention to provide a private wireless communication system and method for controlling a mobile station (MS) using the same. In accordance with the invention, when the MS enters a service area of the private wireless communication system, a company, a government organization and various public places where information security is required can control the MS functions to prevent information leakage via the MS by using the private network.

It is another object of the present invention to provide a private wireless communication system and method for controlling an MS using the same, wherein a function control message is transmitted to the MS without affecting another MS of a mobile public network user in an adjacent area.

It is a further object of the present invention to provide a private wireless communication system and method for controlling an MS using the same, wherein the transmission success/failure of a function control message transmitted from the private wireless communication system to the MS is determined, and if the transmission of the function control message fails, the function control message is transmitted to the MS, thereby improving system reliability.

It is another object of the present invention to provide a private wireless communication system and method for controlling an MS using the same, by means of which function control security information occurring during the function control processing, and security information relating to alarm information concerning the transmission result of a function control message, can be managed by a subscriber database (DB) in the private wireless communication system, or manageability for an operator can be controlled via an information management module so as to actively afford corresponding information in response to a future request by the operator.

In accordance with the invention, when the private wireless communication system broadcasts a system parameter message informing the MS of its entrance into a service area of the private wireless communication system, the MS transmits a registration message to the private wireless communication system via an access channel. Based on the registration message from the MS, the private wireless communication system determines whether or not the MS is registered in the private wireless communication system. If the MS is determined to be registered in the private wireless communication system, the private wireless communication system writes a format of a message for the control of MS functions based upon MS control information set in an additional DB, and transmits the message to the MS, thereby controlling various functions of the MS.

According to an aspect of the invention for realizing the above objects, there is provided a method for controlling a mobile station by using a private wireless communication system, the method comprising the steps of: when a mobile station registered in the private wireless communication system enters a service area of the private wireless communication system, writing at the private wireless communication system a function control message for controlling corresponding functions of the mobile station, and transmitting the function control message to the mobile station; and controlling at least one of the functions of the mobile station based upon the function control message transmitted from the private wireless communication system.

The method of the invention may further comprise: when an acknowledgment message in response to the function control message is not received from the mobile station within a preset time period, retransmitting at the private wireless communication system the function control message to the mobile terminal via a private wireless network.

The function control message may comprise a Feature Notification (FN) message in which information for the control of the functions of the mobile station is added to a predetermined field.

The method of the invention may further comprise: when the mobile station receives the FN message from the private wireless communication system via the private wireless network, examining a predetermined field value of the FN message, and controlling the function of the mobile station based upon the examined field value.

The predetermined field of the FN message maybe an IS-95 information record field.

The function control message may contain at least one of camera locking control information, MP3 player locking control information, multimedia data communication interfacing control information, and record locking control information.

The function control message may contain transmission request information for an acknowledgment message in response to the receipt of the function control message.

The function control message may contain information notifying the mobile station that the mobile station has entered the service area of a private wireless communication system wherein private wireless communication service is available.

The method of the invention may further comprise: when an acknowledgment message in response to the function control message is not received from the mobile station within a preset time period, storing and managing a report value according to the transmission success or failure of the function control message.

The report value may contain at least one of IMSI information registered in a pHLR of the private wireless communication system, ESN information of the mobile terminal, result information according to the transmission success or failure of the function control message, present status information of the mobile terminal, and receipt time information of the acknowledgment message in response to the function control message.

The report value may be stored and managed in a DB of the pHLR or of an additional outside Security Management Center (SMC) server.

The method of the invention may further comprise: locking a corresponding function of the mobile station according to the function control message transmitted from the private wireless communication system, and upon receiving a message informing that the mobile station has moved out of the service area of the private wireless communication system, unlocking and restoring the locked function of the mobile station.

According to another aspect of the invention for realizing the above objects, there is provided a method for controlling a mobile station by using a private wireless communication system, the method comprising the steps of: when a mobile station registered in the private wireless communication system enters a service area of the private wireless communication system, transmitting a system parameter message to the mobile station to inform of the entrance; when an N-zone registration message is received from the mobile station in response to the system parameter message, storing and managing detailed subscriber station information in a separate outside SMC server, writing at the private wireless communication system an FN message for the control of corresponding functions of the mobile station, and transmitting the FN message to the mobile station via a private wireless network; and receiving an acknowledgment message from the mobile station in response to the FN message, storing alarm information contained in the acknowledgment message in the outside SMC server, the alarm information being created according to a station control result, and when an operator system requests subscriber information or the alarm information, providing corresponding information to the operator system.

The N-zone registration message from the mobile station may contain upgrade information for software that enables control over a corresponding function according to the FN message from the private wireless communication system.

The upgrade information may be transmitted to the private wireless communication system by designating a specific value to a return cause field of the N-zone registration message.

In this case, subscriber information and alarm information stored and managed by the SMC server include at least one of IMSI information registered in a pHLR of the private wireless communication system, ESN information of the mobile terminal, IMSI information transmitted from the mobile station, software applicability information for the control of mobile station function, receipt time information of the R-zone registration message, acknowledgment message receipt time information in response to the FN message, present status information of the mobile station, security level information, and security applicability information.

The operator system may be connected to the SMC server via an IP network.

The method of the invention may further comprise: when an acknowledgment message in response to the FN message is not received from the mobile station within a predetermined time period, rewriting and retransmitting the FN by a predetermined number to the mobile station.

After the FN message is retransmitted by the predetermined number, when the acknowledgment message is not received from the mobile station, alarm information according to transmission failure is stored and managed in the SMC server.

According to a further aspect of the invention for realizing the above objects, there is provided a method for controlling a mobile station in a private wireless communication system, the method comprising the steps of: when the mobile station enters a service area of the private wireless communication system, transmitting a system parameter message informing of the entrance to the mobile station, and receiving a location registration message, including a predetermined registration type, from the mobile station; updating location information of the mobile station based on the location registration message, writing an FN message containing information for the control of at least one function of the mobile station, and transmitting the FN message to the mobile station; and controlling at the mobile station a corresponding function by analyzing the FN message from the private wireless communication system, and transmitting an acknowledgment message to the private wireless communication system in response to receipt of the FN message.

The method of the invention may further comprise: when an acknowledgment message in response to the FN message is not received from the mobile station within a predetermined time period, storing and managing a report value according to the transmission failure of the FN message, and when subscriber information or result information according to the transmission of the FN message is requested by an operator system, providing corresponding information to the operator system.

According to another aspect of the invention for realizing the above objects, there is provided a private wireless communication system, comprising a control unit adapted to execute the functions of: when a mobile station registered in the private wireless communication system enters a private wireless communication service area of a mobile public network, writing a function control message for the control of corresponding functions of the mobile station, and transmitting the function control message to the mobile station via a private wireless network; and when an acknowledgment message in response to the receipt of the function control message is not received from the mobile station within a predetermined time period, retransmitting the function control message to the mobile station so as to control at least one multimedia data processing function of the mobile station.

Upon receiving the function control message from the control unit via the private wireless network, the MS examines a predetermined field value of the function control message, and controls a corresponding function based upon the field value.

The control unit may include a statistics/management unit which, when an acknowledgment message responsive to the receipt of the function control message is not received from the mobile station within a predetermined time period, stores and manages a report value corresponding to the transmission success or failure of the function control message and subscriber information for the mobile station.

In this case, the report value corresponding to the transmission success or failure of the function control message and subscriber information managed by the statistics/management unit includes at least one of IMSI information registered in a pHLR of the private wireless communication system, ESN information of the mobile terminal, IMSI information transmitted from the mobile station, software applicability information for the control of mobile station function(s), receipt time information relating to the R-zone registration message, acknowledgment message receipt time information in response to the FN message, present status information of the mobile station, security level information, and security applicability information.

The statistics/management unit may be an SMC server additionally installed outside so as to be connected with the pHLR of the private wireless communication system or the operator system via the IP network.

The SMC server may comprise: a database storing the report value according to the transmission success or failure of the function control message and subscriber information; and a server connected to the operator system via the Internet protocol (IP) network to search the database for the report value and subscriber information when requested by the operator system, and to provide the report value and subscriber information to the operator system via the IP network.

According to yet another aspect of the invention for realizing the above objects, there is provided a private wireless communication system, comprising: a mobile station which, upon entering a service area of a specific private wireless communication network, transmits its location registration message in response to a system parameter message notifying of the entrance into the service area, controls a corresponding function according to a function control message received in response to the location registration message, and transmits an acknowledgment message in response to the receipt of the function control message; and a private wireless communication unit which transmits the system parameter message to the mobile station in response to the entrance of the mobile station into the service area of the private wireless communication network, and writes and transmits a function control message for selective control of at least one function of the mobile station in response to a location registration message.

The private wireless communication unit may comprise: a pHLR which upgrades and stores subscriber information of mobile stations according to additional registration, deletion and location or status change of each mobile station; a pBSC which writes a function control message for the control of the mobile station as the mobile station enters a service area of the private wireless communication system, transmits the function control message to the mobile station, and upgrades subscriber information and process alarm information in response to the transmission result of the function control message; and an SMC server connected to the pHLR to receive corresponding information according to the change of subscriber information of each mobile station from the pHLR and store and manage corresponding information, connected to the pBSC to upgrade and to store subscriber information according to the transmission of the function control message to the mobile station, and to store and manage alarm information generating according to the transmission/receipt result of the function control message, and connected to an operator system to provide subscriber or alarm information to the operator system in response to a request from an operator.

The SMC server may comprise: a database for storing subscriber and alarm information of the mobile stations according to subscribers or alarm types; an information processor connected to the pHLR and the pBSC for receiving subscriber information of each mobile station added to or deleted from the pHLR so as to upgrade subscriber information stored in the database, and for receiving alarm information processed by the pBSC so as to store and manage same in the database; and a web server which is connected to the operator system via an IP network, and which, upon being requested from the operator system for subscriber or alarm information, searches the database for the requested information for provision to the operator system via the IP network.

The database may comprise a subscriber database storing subscriber information and an alarm log database storing alarm information.

In this case, subscriber information stored in the subscriber database may include at least one of receipt information as to whether or not the position registration message is received from the mobile station, receipt time information, present control status information of the mobile station, and receipt time information for the acknowledgment message in response to the function control message.

In addition, alarm information stored in the alarm log information may include at least one of alarm information corresponding to IMSI change relating to the mobile station, alarm information generated when software for controlling a corresponding function according to the function control message is not upgraded, and alarm information corresponding to transmission failure of the function control message.

The private wireless communication unit may further comprise a message transmitter which, when alarm information occurs according to the transmission/receipt of the function control message and acknowledgment message between the pBSC and each mobile station, provides a text message to the mobile station informing of the alarm information.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, in which like reference symbols indicate the same or similar components, wherein.

DETAILED DESCRIPTION OF THE INVENTION

The following detailed description will present embodiments of a private wireless communication system and a method for controlling a mobile station using the same according to the present invention with reference to the accompanying drawings, in which the following systems are only examples presented to illustrate the invention, but those skilled in the art will understand that the invention is by no means limited to such systems.

Figure 1:
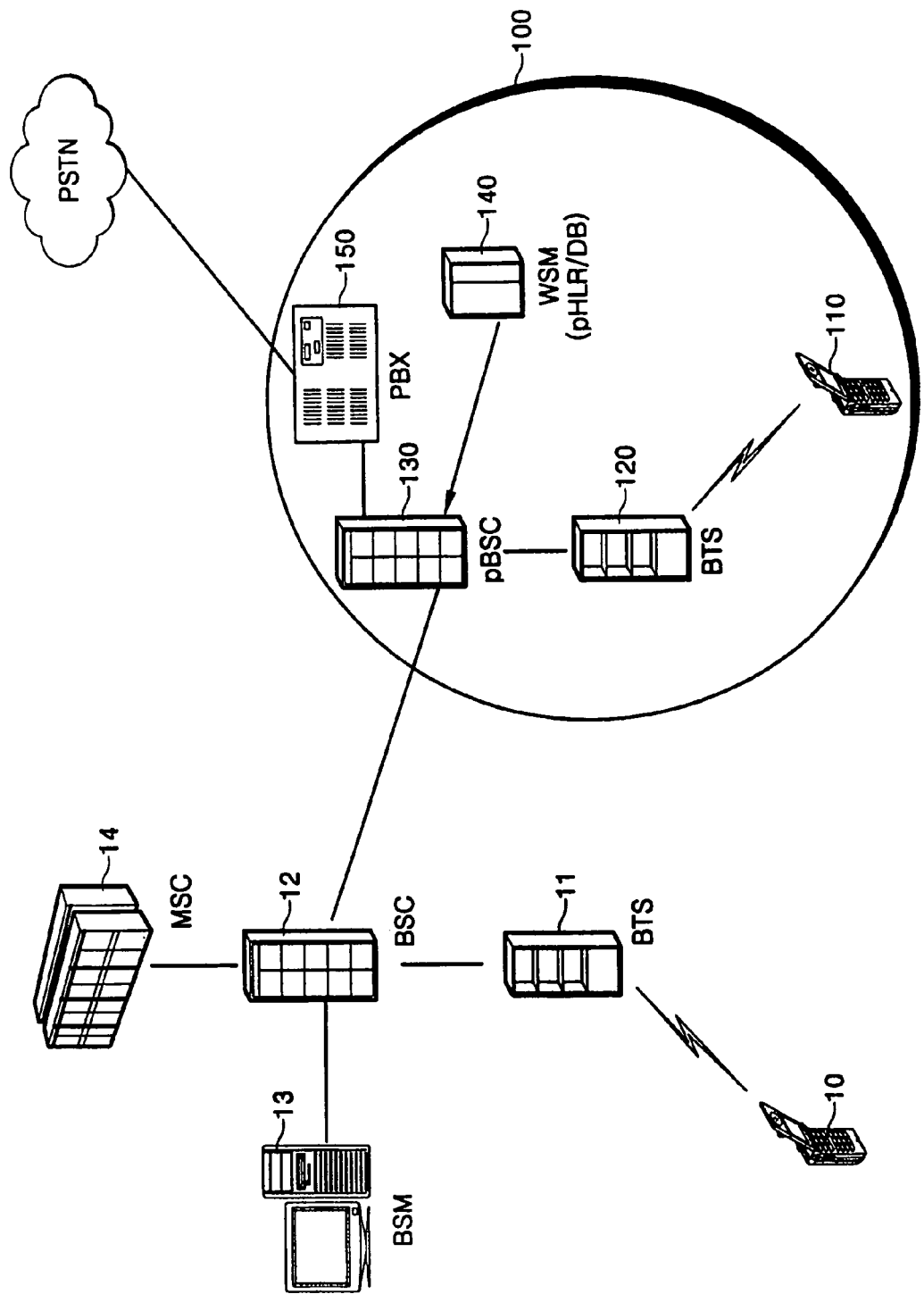
FIG. 1 is a diagram illustrating network construction of a mobile public network and a private wireless communication system according to a first embodiment of the invention.

FIG. 1 is a diagram illustrating network construction of a mobile public network and a private wireless communication system according to a first embodiment of the invention.

As shown in FIG. 1, a private wireless communication system 100 includes a Mobile Station (MS) 110, a base transmitter station (BTS) 120, a pBSC 130, a WSM (pHLR/DB) 140, and a private branch exchange (PBX) 150.

In describing the above components, description of general functions and detailed operations will be omitted, but those operations applicable to this invention will be described. Moreover, the construction of the BTS 120, the pBSC 130, the WSM (pHLR/DB) 140 and the PBX 150 will be described hereinafter by identifying them as a private wireless communication system.

The mobile public network connected to the invention, including the BTS 11, the BSC 12, the BSM 13 and the MSC 14, will not described since it does not have an important relationship to the invention.

According to the invention, when a mobile station enters a specific area (e.g., a service area of the private wireless communication system), the wireless communication system controls the mobile station by transmitting a preset control message to the mobile station. This function will now be described in more detail.

First, as shown in FIG. 1, the pBSC 130 of the private wireless communication system 100 sets a specific bit of a system parameter message via a paging channel, and broadcasts the message via the BTS 120 to the MS 110 located in a service area of the private wireless communication system 100. The system parameter message broadcast from the pBSC 130 via the paging channel and BTS 120 to the MS 110 has a format as shown in Table 1 below:

TABLE 1

System Parameters Message: IS-2000 (F-CSCH)
pilot_pn: 204
config_msg_seq: 3
Sid: 2189
ni: 67
reg_zone: 0
total_zones: 2
zone timer 1 -> 2 minutes
mult_sids: 1
mult_nids: 1
base_id 8243 => 0x2033
base_class 0
. . .
t_add: 28
t_drop: 32
t_comp: 5
t_tdrop: 3
ext_sys_parameter: 1
ext_nghbr_list: 1
gen_nghbr_list: 0
global_redirect: 0

TABLE 1-continued pri-nghbr_list: 0
user_zone_id: 0
ext_global_redirect: 0
ext_chan_list: 0

By assuming that a reserved bit of base_id in the system parameter message is utilized in an N-zone, the MSM 13 may determine whether or not to set a corresponding bit. Current base_id does not use all bits of a total of 16 bits. Assuming that an upper 3rd bit is a reserved bit, the BTS 120 of the private wireless communication system broadcasts the system parameter message by setting the 3rd bit of base_id of the system parameter message to 1. That is, the BTS 120 uses the system parameter message of the paging channel to inform the MS 110 that it is being served by the private wireless communication system.

The private wireless communication system 100 broadcasts the system parameter message to the MS by setting a specific bit in a system parameter message of a paging channel message. In this case, the private wireless communication system 100 sets a reserved bit, which is not used in the system parameter message, to a predetermined value, thereby informing the MS 110 of its current location in a service area of the private wireless communication system 100.

More specifically, the private wireless communication system 100 sets the 3rd bit of base_id in a system parameter message format shown in Table 1 above to "1", and broadcasts the system parameter message containing the set value to all MSs 110 located in the service area.

Accordingly, when the MS 110 enters the service area of the private wireless communication system 100, the MS 110 searches the 3rd bit of base_id in the system parameter message transmitted from the private wireless communication system 100 to determine whether or not the bit value is set to "1."

If the bit value is set to "1", the MS 110 recognizes that it has currently entered the service area of the private wireless communication system 100 and is now being served by the same.

In this respect, those skilled in the art will understand that the bit value is not limited to the 3rd bit of base_id of the system parameter message unlike in the foregoing embodiment, but can be any reserved bit in the system message parameter.

When the MS 110 confirms that it has entered the service area of the private wireless communication system 100 and is being served by the same, the MS 110 transmits a registration message to the BTS 120 of the private wireless communication system 100 via an access channel.

That is, the MS 110 adds a current registration type value to a "Location Registration Type" field of the registration message, and transmits the registration message having the registration type value to the BTS 120 of the private wireless communication system via the access channel.

Types of registration messages that the MS 100 transmits to the BTS 120 of the private wireless communication system via the access channel are shown in Table 2 below:

TABLE 2

| LR_TIME_BASE | 0 |
| LR_POWER_ON | 1 |
| LR_ZONE_BASE | 2 |
| LR_ZONE_OFF | 3 |

TABLE 2-continued

| LR_PARA_CHANGE | 4 |
| LR_ORDER | 5 |
| LR_DISTANCE | 6 |
| LR_N_ZONE | 13 |

When a registration message as shown in Table 2 above is transmitted by the MS 100 to the BTS 120 located in the service area of the private wireless communication system via the access channel, this message reports the location of MS 100 in N-zone or the service area of the private wireless communication system 100. In order to identify this registration message, N-zone registration type is newly defined.

The MS 110 transmits a registration message, as LR_N_ZONE Type which is a newly defined Registration type, to the BTS 110 of the private wireless communication system 100 via the access channel. In this case, by additionally transmitting a flag enabling a determination as to S/W Update of the MS 110 on an Optional field in the registration message, S/W update information with respect to MS 110 is stored in the pHLR. As a result, the private wireless communication system 100 can determine the current condition as to the application of S/W for controlling the functions of the MS.

The N-zone registration type uses an element identifier which is not used as a registration type proposed by standard 3G-IOS.

However, it will be apparent to those skilled in the art that such an identifier can be designated in all communication networks to which this invention is applicable.

When a registration message is received from the MS 110 located in the service area of the private wireless communication system 100 via the access channel as described above, the private wireless communication system 100 analyzes the received registration message of the MS 110 to determine whether the MS can be served by the private wireless communication system 100.

That is, if the pBSC 130 of the private wireless communication system 100 determines that the registration message received from the MS 110 is of an N-zone registration message type, the pBSC 130 searches a WSM or a subscriber DB of the pHLR 140 to determine whether the MS 110 is registered in the private wireless communication system 100.

If the MS 110 is registered in the private wireless communication system 100, the pBSC 130 of the private wireless communication system 100 transmits a Feature Notification (FN) message to the MS 110 via the BTS 120. The FN message contains information used for controlling various functions of the MS 110, such as a camera function, an MP3 player function and an interfacing function for multimedia data communication with an external device (e.g., a USB data communication function). The pBSC 130, when receiving an N-zone registration (Location Update) message, searches a subscriber DB with an ESN contained in the N-zone registration message to compare an IMSI value transmitted from the MS 110 with an IMSI value stored in the subscriber DB of the pHLR 140 in order to determine whether the IMSI of the MS 110 has changed.

If the IMSI has changed, the pBSC 130 transmits a corresponding report message to the subscriber DB of the pHLR 140.

That is, since the pBSC 130 receives an N-zone registration message from the MS 110 when the subscriber has entered the N-zone network, information about N-zone Regi (YES) is updated in the pHLR. For reference, information about N-zone Regi is set by NO when the pHLR 140 is restarted every day at dawn, and N-zone Regi (NO) information of the subscriber is updated in a subscriber DB of the pHLR when the subscriber's MS is powered off. Information updated in the subscriber DB of the pHLR 140 may include information corresponding to receipt of an N-zone registration message from the MS 110. Such information may include at least one of receipt success/failure, location registration message receipt time, and control-status of MS.

The control-status information of the MS corresponds to a receipt result of an acknowledgment message in response to the FN message, which is transmitted to the MS for controlling the functions of the MS as will be described later, and can be expressed as "No Response" when the N-zone registration message transmitted from the MS 110 is received.

When a location registration message corresponding to the power-off of the MS 110 is received from the MS 110, the pBSC 130 of the private wireless communication system 100 updates location registration receipt information and control-status information of the MS in the subscriber DB of the pHLR 140. In this case, location registration receipt information of the MS (as an example of information that is updated in the subscriber DB of the pHLR 140 at power-off of the MS as described above) is updated by "NO" since a further location registration message cannot be received from the MS, and control-status information of the MS is updated by "power-off" to indicate that the current MS is powered off.

After location information of the MS 110 is updated in the subscriber DB of the pHLR 140, the pHSC 130 writes and transmits an FN message, used for controlling the functions of the MS 110, to the MS 110 via the BTS 120. The FN message has a structure as shown in Table 3 below:

TABLE 3

| Information Element | Section Reference | Element Direction | Type | |
|---|---|---|---|---|
| Message Type | 6.2.2.4 | MSC->BS | M | |
| Mobile Identity (TMSI/MSIMIN/ESN) | 6.2.2.16 | MSC->BS | M$^a$ | |
| Tag | 6.2.2.62 | MSC->BS | O | C |
| Call Identifier List | 6.2.2.21 | MSC->BS | O$^b$ | C |
| Slot Cycle Index | 6.2.2.17 | MSC->BS | O$^c$ | C |
| Signal | 6.2.2.50 | MSC->BS | O$^d$ | C |
| Message Wating Indication | 6.2.2.48 | MSC->BS | O$^{e,d}$ | C |
| Calling Party ASCII number | 6.2.2.37 | MSC->BS | O$^d$ | C |
| IS-95 Information Records | 6.2.2.72 | MSC->BS | O$^f$ | C |

(Spec. IOS 4.0)

By setting the value of IS-95 Information Record field in the FN message structure, as seen in Table 3 above, it is possible to control various functions of the MS 110.

The FN message structure for controlling the functions of the MS 110 will be described in more detail.

When the FN message is written, it is possible to set the capability of using MS functions in a corresponding area by referring to system control options set in the subscriber DB of the pHLR 140 of the private wireless communication system 100. Alternatively, functions can be selectively controlled according to subscriber, MS, system policy and operator selection.

If a camera function of the MS 110 is set to "disabled" in the subscriber DB of the pHLR 140, a corresponding Bit of Content field of IS-95 Information Records seen in Table 3 above is set to 1, and is transmitted to the MS.

If IS-95 Information Records are defined by a new type of 0xfd to control the functions of an MS, an Information Record field as shown in Table 4 below will be added:

TABLE 4

| 7 | 6 | 5 | 4 | 3 | 2 | 1 | 0 | Octet | Value |
|---|---|---|---|---|---|---|---|---|---|
| Information Record Type - k | | | | | | | | j | 0xfd |
| Information Record Length - k | | | | | | | | j + 1 | 0x02 |
| Information Record Content - k | | | | | | | | | |
| ① | ② | ③ | ④ | ⑤ | ... | ... | ... | j + 2 | 0x80 |
| ... | ... | ... | ... | ... | ... | ... | (f) | j + 3 | 0x00 |

In Table 4 above, ① may correspond to a camera function control field, and ② to (f) may correspond to terminal function control fields for various functions of, for example, interfacing multimedia data communication with an external device (e.g., USB data communication locking) and record locking. Herein, it will be apparent to those skilled in the art that the field structure is not limited to that described above, but can be in various other forms.

For reference, the structure of IS-95 Information Record field defined in Spec. IOS-4.0 is as shown in Table 5 below:

TABLE 5

| 7 | 6 | 5 | 4 | 3 | 2 | 1 | 0 | Octet | Value |
|---|---|---|---|---|---|---|---|---|---|
| A1 Element Identifier | | | | | | | | 1 | 0x15 |
| Length | | | | | | | | 2 | 0x07 |
| Information Record Type - 1 | | | | | | | | 3 | 0x01 |
| Information Record Length - 1 | | | | | | | | 4 | 0x01 |
| Information Record Content - 1 | | | | | | | | Variable | 0xff |
| Information Record Type - 2 | | | | | | | | j | 0xfd |
| Information Record Length - 2 | | | | | | | | j + 1 | 0x02 |
| Information Record Content - 2 | | | | | | | | Variable | 0xff |
| ... | | | | | | | | ... | |
| Information Record Type - n | | | | | | | | k | |
| Information Record Length - n | | | | | | | | k + 1 | |
| Information Record Content - n | | | | | | | | Variable | |

In Table 5 above, 0xff is used as a first Information Record Content to display an N-zone icon for informing the subscriber that the MS 110 has entered N-zone, and 0×8000 is used as a second Information Record Content to control MS functions (only first control bit is set to 1=>camera locking).

When the private wireless communication system 100 transmits an FN message as described above, the MS 110, upon receiving the FN message, enables or disables corresponding functions by referring to Base_id, which is read as system parameter value, and to the Information Record field value in the received FN message.

If the MS 110 is out of the service area of the private wireless communication system 100, Base_id value is changed. Thus, the MS 110 converts its mode so as to enable disabled functions again.

However, there may be a situation where the MS 110 does not normally receive an FN message from the private wireless communication system 100, even though it has entered the service area of the private wireless communication system 100.

The private wireless communication system of this invention is devised to control the functions of the MS 110 to ensure security, and thus the FN message has to be retransmitted in the above situation. If an FN acknowledgment message is not received within a preset time period because the MS 110 has failed to receive an FN message, the pBSC 130 retransmits an FN message to the MS 110. The following discussion will describe such a process.

First, when the pBSC 130 of the private wireless communication system 100 writes an FN message, the pBSC 130 designates whether or not to request an ACK from the MS by setting the field value of a TAG Field message as in Table 6 below:

TABLE 6

| 7 | 6 | 5 | 4 | 3 | 2 | 1 | 0 | Octet |
|---|---|---|---|---|---|---|---|---|
| A1 Element Identifier | | | | | | | | 1 |
| Length | | | | | | | | 2-5 |

According to the description in IOS Spec, in the case of requesting a response to a transmitting message, it is possible to add a Tag field to a Request message so that the Tag field can be used as a reference indicating the response (IOS 4.0 6.2.2.62: this element provides a reference for correlating a response to the original request; if the sender desires a response, then this element is included in the request message).

Describing packet or message forwarding by an S/W block from the pBSC 130 to the BTS 120 in the private wireless communication system 100 of this invention, if a Tag field exists in a message forwarded from an upper block, the pBSC 130 forwards the message to the BTS 120 by setting Ack_required to 1. If Ack_required is set to 1, the BTS 120 requests acknowledgment in response to a Request message from the MS 110, and transmits a response result to the pBSC 130. According to the invention, by using this flow, it is possible to receive an acknowledgment from the MS 110 in response to FN message transmission, and if transmission fails, to collect and provide statistics for retransmission and management to an operator, thereby ensuring system reliability.

Figure 2:
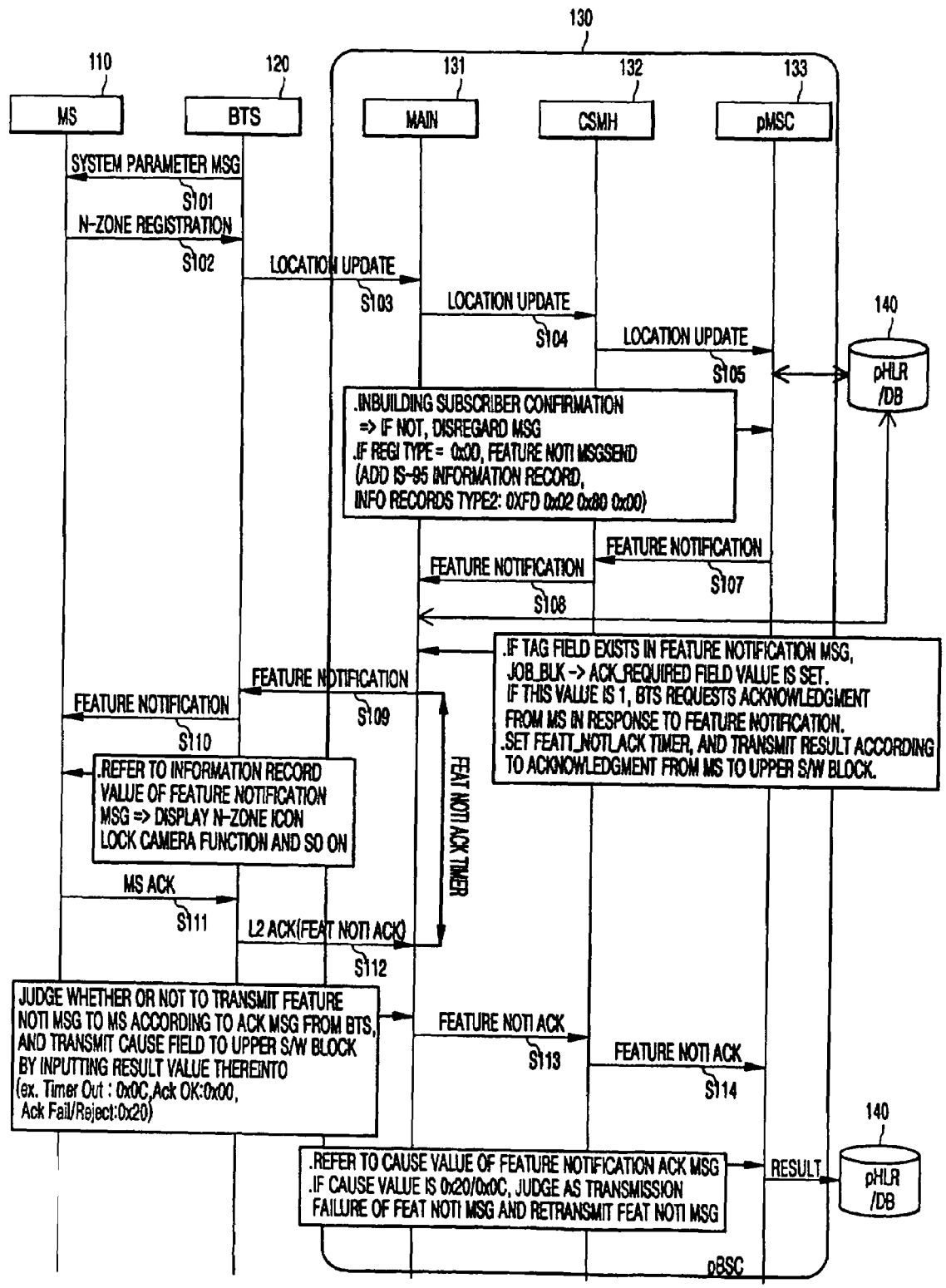
FIG. 2 is a flowchart illustrating message flow in an MS control method by using the private wireless communication system according to the first embodiment of the invention.

FIG. 2 is a flowchart illustrating message flow in a method for controlling an MS by using the private wireless communication system according to the invention.

As shown in FIG. 2, the pBSC 130 includes a MAIN block 131, a Common Signaling Message Handler (CSMH) 132 and a private Mobile Switching Center (pMSC) 133.

The pMSC 133 is an S/W block cooperating with a PBX 150 in a private wireless communication network to process calls, the CSMH 132 is an S/W block communicating an IOS message to the pMSC 133, and the MAIN block 131 is an S/W block in the pBSC 130 for processing a message transmitted to/received from the BTS 120.

After the pBSC 130 transmits an FN message to the MS 110 via the BTS 120 so as to control the functions of the MS 110, the pBSC 130 sets a timer for a response message reporting whether or not the FN message is received.

The timer is set with respect to the FN message in order to confirm whether or not the message is properly transmitted, and not to influence existing call processing. Thus, the timer is set by the MAIN S/W block 131 which processes message transmission, as well as communicates with the BTS 120. In this case, those values set in the DB 140 of the private wireless communication system 100 are set as timer values.

The MAIN block 132 determines whether to retransmit the FN message by referring to Cause Value. This is determined based upon the existence and result value of an ACK message sent from the BTS 120 to the pMSC 133. In this case, an FN ACK message for the private wireless communication network has to be re-defined since a corresponding Field does not exist in an FN ACK message format defined by Spec. ISO 4.0.

The FN ACK message defined by Spec. IOS 4.0 has a structure as shown in Table 7, and an FN ACK message defined by the private wireless communication system of the invention has a structure as shown in Table 8.

TABLE 7

| Information Element | Section Reference | Element Direction | Type | |
|---|---|---|---|---|
| Message Type | 6.2.2.4 | MSC->BS | M | |
| Mobile Identity (TMSI/MSIMIN/ESN) | 6.2.2.16 | MSC->BS | M[3] | |
| Tag | 6.2.2.62 | MSC->BS | O | C |

TABLE 8

| Information Element | Reference | Direction | CDMA |
|---|---|---|---|
| Message Type | Section 6.2.2.4 | pMSC->BS | M |
| Mobile Identity (IMSI) | Section 6.2.2.16 | pMSC->BS | M |
| Mobile Identity (ENS) | Section 6.2.2.16 | pMSC->BS | O |
| Tag | 6.2.2.62 | pMSC->BS | O |
| Cause | 6.2.2.19 | pMSC->BS | N-zone only |

The MAIN block 132 of the pBSC 130 sets a Cause field according to the FN ACK message forwarded from the BTS 120, and forwards the Cause field to the pMSC 133. The invention defines Cause values for example as follows:

MS Ack Timer Out: 0x0C, MS Ack OK: 0x00, MS Ack Fail/Reject: 0x20

When a Cause field value of an Ack message forwarded to the pMSC is 0x0C or 0x20, it is determined that the FM message is not properly forwarded to the MS 110, and the FN message is retransmitted to the MS 110. In this case, by referring to Tag field value which was set at the time that the FN message was originally transmitted, the FN message is retransmitted to the MS 110, which has transmitted the Ack message (or treated as time-out). The number of FN message retransmissions can be set within a range that does not cause overload to the system according to private wireless communication network environment.

Reference will now be made to a reporting operation corresponding to FN message transmission failure after FN message retransmission.

The pBSC 130 transmits an FN message transmission result relative to the MS 110 to the pHLR 140 of a Wireless System Manager (WSM) in order to maintain and manage security.

While a report value of a retransmission result of the FN message may have different formats according to operating areas, the format applicable to the invention can be defined as in Table 9 below:

TABLE 9

| Index | IMSI registered in pHLR | ENS | IMSI transmitted from MS | MS S/W applied? | Result |
|---|---|---|---|---|---|

An IMSI field registered in the pHLR 14 is compared with that of an MS 110 that transmitted a registration message so as to determine whether the number of the MS 110 is intentionally changed.

By referring to the flowchart shown in FIG. 2, a method of controlling MS functions in a private communication system according to the invention, which corresponds to the aforedescribed operation of controlling MS functions in a private wireless communication system according to the invention, will be presented.

As shown in FIG. 2, the BTS 120 of the private wireless communication system 100 transmits a system parameter message containing notification information to the MS 110 via a paging channel in order to notify the MS 110 of its entrance into a service area of the private wireless communication system 110 in S101. In this case, notification information for notifying the MS 110 of its entrance into the service area of private wireless communication system is transmitted by setting a specific bit in the system parameter message to "1" so that the MS 110 can confirm its entrance into the service area by inspecting the specific bit value.

In S102, the MS 110, upon confirming entrance into the service area of the private wireless communication system, transmits an N-zone registration message to the BTS 120 via an access channel.

In response to the registration message received from the MS 110, the BTS 120 transmits a location information update request message via the MAIN block 131 and the CSMH 132 in order to update location information of the MS 110 in S103, S104 and S105.

The pMSC 133 of the pBSC 130 searches the pHLR 140 to determine whether the MS 110, which has entered the service area of the private wireless communication system 100, is registered in the private wireless communication system 100. If the MS 110 is not registered in the private wireless communication system 100, the pMSC 133 disregards the received registration message. If the MS 110 is registered in the private wireless communication system 100, the pMSC 133 updates location information of the MS 110 in the pHLR 140, and then generates and transmits an FN message to the MAIN block 131 via the CSMH 132 in S107 and S108. The FN message contains information about the functions of the MS 110, such as information for locking a camera and an MP3 player, and stopping USB port-based data communication. Such information for updating location information of the MS 110 in the subscriber DB of the pHLR 140 will not be described further since it was described in detail above.

In S109, if there is a tag field of the FN message received from the pMSC 133, the MAIN block 131 of the pBSC 130 sets an ack_required field value for a acknowledgment message in response to the FN message from the MS 110, and then transmits the FN message to the BTS 120.

In S110, the BTS 120 inspects the ack_required field value of the FN message transmitted from the MAIN block 131 of the pBSC 130, and if the field value is set to "1" (for example), the BTS 120 sets a response timer according to FN message receipt, and transmits the FN message to the MS 110. In this case, the FN message contains response request information about the FN message receipt.

Upon receipt of the FN message, the MS 110 analyzes an Information Record value of the FN message, displays an icon reporting N-zone entrance according to a preset program so that the user can easily confirm that he/she has entered the service area of the private wireless communication system, and controls each function according to a preset control program.

In S111, in response to FN message receipt, the MS 110 transmits an acknowledgment (MS ACK) message to the BTS 120.

In S112, the BTS 120 sends the acknowledgment message received from the MS 110 to the MAIN block 131 of the pBSC 130.

The MAIN block 131 of the pBSC 130 analyzes the acknowledgment message received from the BTS 120 to determine whether or not to transmit an FN message to the MS 110, and then, by setting a determination result value to the Cause Field value, transmits the Cause Field value to an upper block (that is, the pMSC 133 via the CSMH 132 in S113 and S114). The MAIN block 131 can set an acknowledgment message receipt result value relating to FN message receipt to the Cause field as follows: "0×0C" is set to indicate that the acknowledgment message is not received from the MS 110 for a predetermined time period, "0×00" is set to indicate that the acknowledgment message is received in response to FN message receipt (Ack OK), and "0×20" is set to indicate that FN message transmission is failed (Ack Fail/Reject).

The pMSC 133, as an upper S/W block of the pBSC 130, inspects the Cause Field value of the acknowledgment message in response to the FN message, which is transmitted from the MAIN 131, in order to determine whether the FN message is transmitted according to set the value. That is, the pMSC 133 inspects the Cause Field value of the received acknowledgment message, and if the field value is "0×20" or "0×0C", determines that FN message transmission to the MS 110 failed, and rewrites and retransmits an FN message to the MS 110 to control the functions of the MS 110 according to the same process as described above.

In S115, the pMSC 133 registers the result value in the subscriber DB of the pHLR 140, and separately manages the result value as statistics information relating to whether the MS has received the FN message.

The private wireless communication system and the MS control method will now be summarized.

In order to control additional functions of the MS 110, it is necessary to modify MS S/W. First, when the private wireless communication system 100 informs the MS 110 of its entrance into the service area of the private wireless communication system 100 with a system parameter message transmitted to the MS 110 via paging channel broadcasting, the MS 110 transmits a registration message to the private wireless communication system 100 via the access channel.

The private wireless communication system 100 can determine whether the MS 110 is registered in its private network based upon the registration message from the MS 110. If the MS 110 is registered in the private network, a message is written for controlling MS functions based upon MS control information set in the subscriber DB of the pHLR, and the message is transmitted to the MS 110, thereby controlling the MS functions. When transmitting the message containing MS control information, the private wireless communication system 100 requests an acknowledgment message from the MS 110, and if the acknowledgment message is not received within a predetermined time period, it rewrites and retransmits the MS control message to the MS 110, so as to control the MS functions.

In order to carrying out such functions, it is required that the S/W function of the MS 110, as well as a function of the private wireless communication system 100, be modified.

Such S/W modification will be described in brief.

First, regarding S/W modification in the MS 110, when a specific bit of Base_id is set in the BSM 13 shown in FIG. 1, the BTS 120 transmits a system parameter message to the MS 110 via a paging channel. The system parameter message transmitted to the MS 110 contains a set Base_id.

S/W in the MS 110 has to be modified so that the MS 110, upon receiving the system parameter message from the private wireless communication system 100, reads the set Base_id value (as entered N-zone), and transmits an N-zone registration message to the private wireless communication system 100. The MS 110 also sets a flag for distinguishing application of the modified S/W, and transmits the flag on the N-zone registration message to the private wireless communication system 100.

The S/W of the MS 110 also has to be modified so that the functions of the MS 110 can be locked/unlocked with reference to Information record values as elements of the FN message transmitted from the private wireless communication system 100.

If the registration message from the MS 110 is an N-zone registration (0×0D) and the MS 110 is registered in the pHLR 140 of the private wireless communication system 100, the private wireless communication system has to write an FN message by referring to MS function control/allowance confirmation fields set in the DB 140, and to transmit the FN message to the MS 110.

The private wireless communication system 100 stores a Tag field value in the FN message when transmitted to the MS 110 so that the MS 110, upon receiving the FN message, transmits an Ack message to the BTS 120. The BTS 120 transmits a result value to the pBSC 130 in response to the Ack message from the MS 110. It is determined whether the FN message is normally transmitted according to the result value so that, in the case of transmission failure, the FN message can be retransmitted to control the MS 110 functions.

After message transmission acknowledgment or FN message retransmission, a result value relating to transmission success/failure is transmitted to the subscriber DB of the pHLR to be used as a reference. As for an MS to which transmission fails or which is determined to be not applicable with a new MS S/W, result values related to the MS are subdivided so that the MS can be analyzed for security. Then, the result values are stored in the subscriber DB of the pHLR so that an operator can easily make a report afterward.

According to the first embodiment of the invention, result alarm information in response to FN message transmission for subscriber location update and MS function control can be managed via the pHLR in the private wireless communication system 100. The second embodiment of the invention is so devised that a separate Security Management System (SMS) is connected to a pBSC without a pHLR, and to an operator management system via the IP network, so that an operator can easily report security management information relative to an MS.

The second embodiment of the invention will now be described in detail, with reference to the accompanying drawings, in view of MS management information update without describing functions the same as, or similar to, those of the first embodiment described and illustrated with reference to FIGS. 1 and 2.

Figure 3:
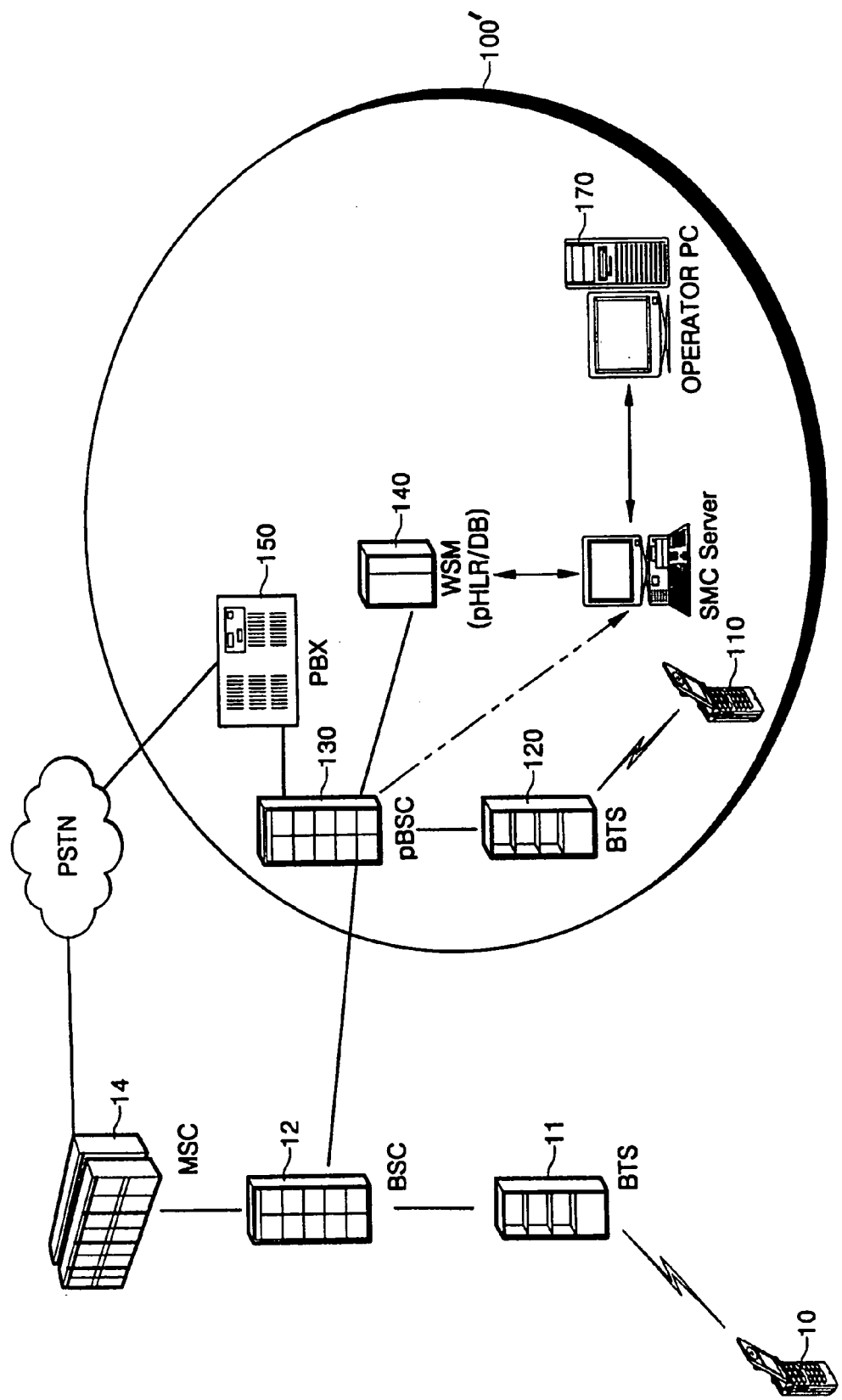
FIG. 3 is a diagram illustrating network construction of a mobile public network and a private wireless communication system according to a second embodiment of the invention.
Figure 4:
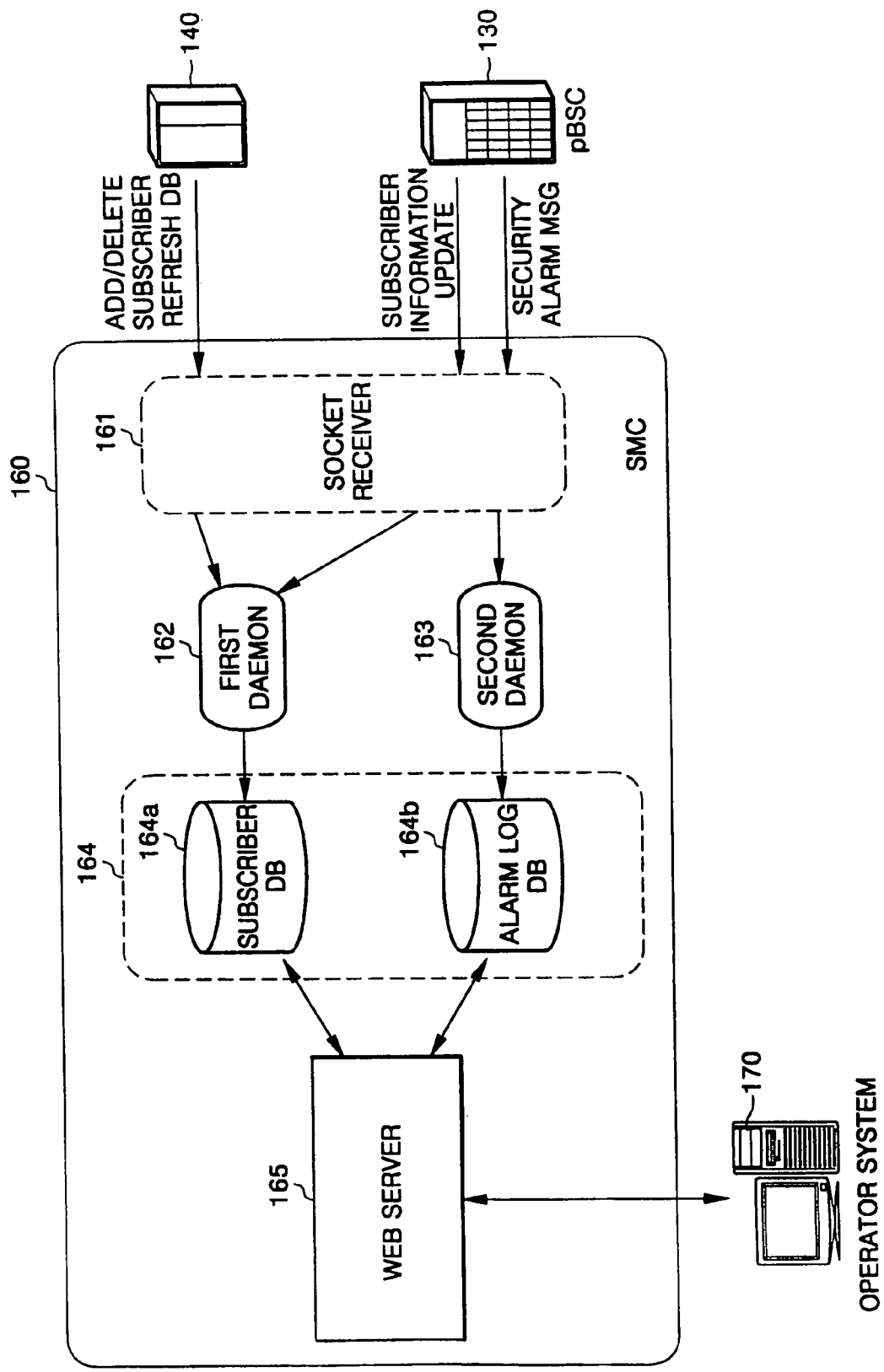
FIG. 4 is a detailed block diagram of an SMC shown in FIG. 3.

FIG. 3 is a diagram illustrating network construction of a mobile public network and a private wireless communication system according to a second embodiment of the invention, and FIG. 4 is a detailed block diagram of an SMC shown in FIG. 3.

As shown in FIG. 3, a private wireless communication system 100' according to the second embodiment of the invention further includes an SMC 160 connected to a pBSC 130 and adapted to store and manage subscriber location registration information provided from the pBSC 130 and result information according to FN message transmission for MS control.

The SMC 160 is also connected to a pHLR 140 to receive any subscriber information added to, or canceled by, the pHLR 140 and subscriber list information so that the operator can easily manage such information. The subscriber list information is generated when the entire subscriber information is refreshed.

Furthermore, the SMC 160 is connected to an operator system 170 via the IP network so that security information stored and managed in the SMC 160 via the IP network can be easily reported.

The SMC 160 can be generally divided into two parts. One part is a subscriber information management DB, which functions to update subscriber information when it is added to, or canceled from, the subscriber DB of the pHLR 140. The information management DB also functions to update corresponding subscriber information when the pBSC 130 requests MS control information update. The other part is an alarm log DB for storing log information relating to an alarm case occurring in transmission of a security Feature Notification (FN) message for a corresponding subscriber MS, in which the log information is result information about transmission/receipt of the security function control message. In other words, the alarm log DB functions to manage alarm information, which can occur before an acknowledgment message is received from the MS in response to an FN message transmitted from the private wireless communication system 100, and to provide an alarm information list to the operator system 170.

As shown in FIG. 4, the SMC 160 includes a socket receiver 161, first and second daemons 162 and 163, a DB 164, and a web server 165. The DB 164 includes a subscriber DB 164a and an alarm log DB 164b.

The SMC 160 has a subscriber DB separate from that of the pHLR 140. The first daemon 162 of the SMC 160 receives information (update information) relative to a subscriber DB, having a structure substantially the same as that of the pHLR/pVLR 140, via the socket receiver 161 from the pBSC 130 and the pHLR 140, and then stores the received update information in the subscriber DB 164a of the DB 164.

Such update information received from the pBSC 130 and the pHLR 140 may include subscriber update information, which is added to/canceled from the pHLR 140 when subscriber information is added to/canceled from the pHLR 140, and the entire subscriber list information transmitted from the pHLR 140 after refreshment of the entire subscriber information stored in the pHLR 140. That is, the update information is made by daily initialization of a field for displaying N-zone registration message receipt information or security information, or of the whole subscriber list information from the pHLR 140.

In addition, the update information received from the pBSC 130 and the pHLR 140 may further include registration message receipt time information and MS control status information in the case of receiving an N-zone registration message from the MS 110, acknowledgment message receipt time information and MS control status information in the case of receiving an acknowledgment message from the MS 110 in response to the FN message, and MS control status information in the case of receiving a registration message about power-off from the MS 110.

The second daemon 163 shown in FIG. 4 allows the pBSC 130 to transmit an FN message to the mobile station 110 via the BTS 120. In addition, the second daemon 163 receives a report message concerning alarm information via the socket receiver 161 through the pBSC 130, the alarm information occurring during the receipt of a response message from the MS 110 relative to receipt or non-receipt of the FN message, and stores and manages information contained in the report message concerning the received alarm information in the alarm log DB 164b.

When the operator system 170 requests corresponding information via the web server 165, the second daemon 163 functions to provide a list according to subscribers or alarm types. The operation of alarm distinction will be described in detail hereinafter.

The web server 165 of the SMC 160 is connected to the operator system 170 via an IP network. The web server 165 provides a tool to the operator system 170 via the IP network so that the operator system 170 can easily retrieve and manage subscriber information and alarm information stored in the DB 164 of the SMC 160 in a web environment. If the operator system 170 requests subscriber information, security-related information and alarm information stored in the DB 164, the web server 165 also searches for and provides corresponding information to the operator system 170 via the IP network.

A management method of subscriber information, security-related information and alarm information according to the second embodiment of the invention will now be described in detail with reference to the accompanying drawings. However, a detailed description of functions the same as, or similar to, those of the first embodiment shown in FIGS. 1 and 2 will be omitted. Such functions correspond to the flow of registration message transmission/receipt, FN message transmission/receipt and FN message retransmission.

At the start-up of the SMC 160, the first daemon 162 of the SMC 160 transmits a subscriber information request message to the pHLR 140. In response to the subscriber information request, the pHLR 140 retrieves subscriber information stored in its subscriber DB, and stores/manages the subscriber information in the subscriber DB 164*a*.

In the case of subscriber information addition/deletion, the pHLR 140 provides added/deleted subscriber information to the SMC 160 so that the subscriber DB of the PHR 140 can maintain the same subscriber information as the subscriber DB 164*a* of the SMC 160. If necessary for security management/operation, a specific field of subscriber DB information can be initialized and transmitted to the SMC 160. Such information can be managed as initialized daily (every 24 hours), and examples thereof may include MS location registration and MS control status.

In response to an MS control message sent from the private wireless communication system 100' to the MS 110, the subscriber DB 164*a* of the SMC 160 updates subscriber information according to a following process, as described with reference to FIG. 5.

Figure 5:
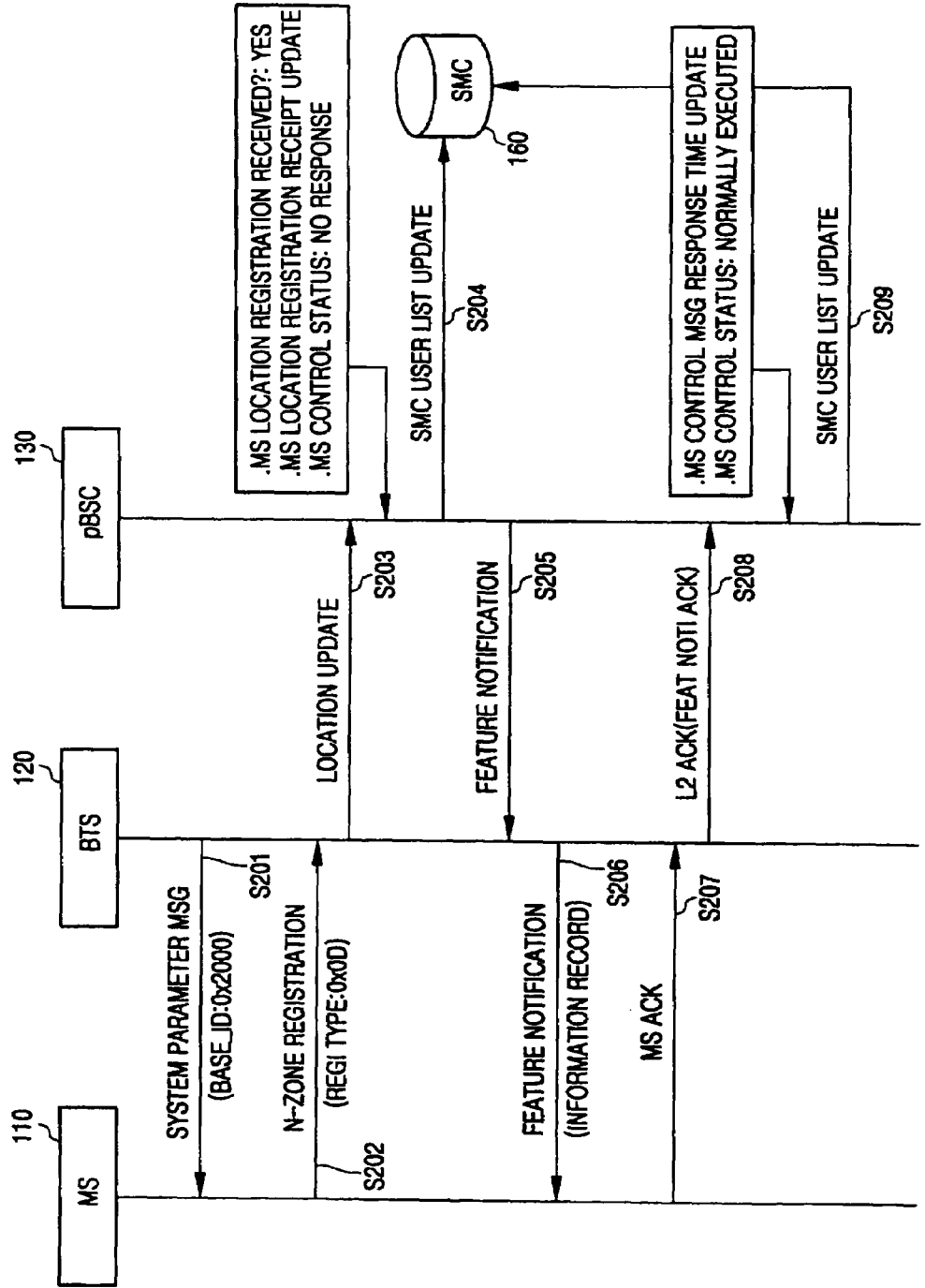
FIG. 5 is a flowchart illustrating a method for updating an SMC subscriber DB where the private wireless communication system controls MS functions according to the second embodiment of the invention.

FIG. 5 is a flowchart illustrating a method for updating an SMC subscriber DB where the private wireless communication system controls MS functions according to the second embodiment of the invention.

First, as shown in FIG. 5, the private wireless communication system 100' transmits a system parameter message to the MS 110 via the BTS 120, informing the MS 110 of its entrance into a service area of the private wireless communication system 100' in S201. Then, the MS 110 transmits an N-zone registration message or location registration message to the BTS 120 of the private wireless communication system 100' in S202.

The BTS 120 provides the location registration message from the MS 110 to the pBSC 130 in S203, and the pBSC 130 provides received location registration information or subscriber information of the MS 110 to the SMC 160 for the purpose of subscriber information update in S204. The subscriber information to be updated may include location registration message receipt information, location registration message receipt time information, and present MS control status information.

Since the location registration message is received from the MS 110, the pHLR 140 can update MS location registration receipt information as "YES" in the subscriber DB 164*a* of the SMC 160. Also, since an FN message for MS control is not transmitted, and thus a security function of the MS 110 is not controlled, MS control status information can be updated as "No response" in the DB 164*a* of the SMC 160. In this case, subscriber information update can be carried simultaneously in both of the subscriber DBs of the SMC 160 and the pHLR 140.

MS control status can be determined by various methods. Information value can be defined in a different type as information of the subscriber DB 164*a*. However, according to this embodiment of the invention, a control status field is updated if an acknowledgment message in response to an FN message, as an MS function control message, is received from the MS 110 when a location registration message (that is, an N-zone registration message) is received. For example, if the N-zone registration message is received from the MS 110, MS control status information may be updated as "No response" in the subscriber DB 164*b* of the SMC 160. Also, if the acknowledgment message in response to an FN message is received, MS control status information may be updated as "Normally executed" in the subscriber DB 164*b* of the SMC 160. In this case, if the current status of the MS 110 is not normally executed, the operator can make a determination based upon the receipt time of the N-zone registration message and the receipt time of an acknowledgment message in response to an FN message. The operator can also determine MS status by calculating the difference between the receipt times of the messages.

As a result, in FIG. 5, after MS location registration information is updated, the pBSC 130 writes an FN message for controlling security-related functions of the MS 110, and transmits the FN message to the MS 110 via the BTS 120 in S205 and S206. Upon receiving the FN message, the MS 110 controls corresponding functions according to control information contained in the FN message, and then transmits an acknowledgment message in response to the receipt of the FN message to the pBSC 130 via the BTS 120 of the private wireless communication system 100' in S207 and S208.

Upon receiving the acknowledgment message in response to the FN message from the MS 110 via the BTS 120, the pBSC 130 updates FN message receipt time information and MS control status information in the subscriber DB 164*a* of the SMC 160 in S209. Then, MS control status information is updated as "Normally executed" in the subscriber DB 164*a* of the SMC 160. It is also to be understood that the pBSC 130 can update subscriber information not only in the subscriber DB 164*a* of the SMC 160, but also in the subscriber DB of the pHLR 140 to order to maintain consistency of information.

A process of updating the subscriber DB 164*a* of the SMC 160 in the case of status change of the MS 110 (for example, power-off) will now be described with reference to FIG. 6.

Figure 6:
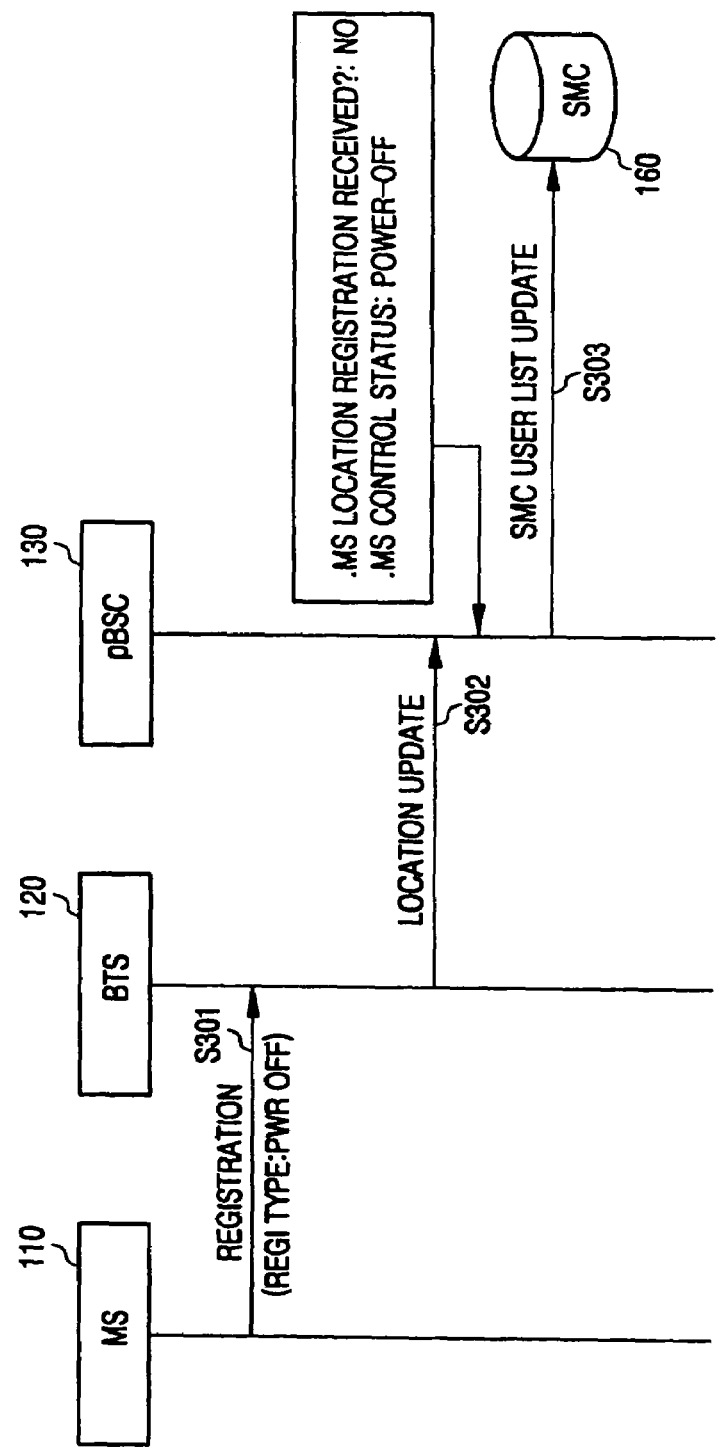
FIG. 6 is a flowchart illustrating a method for updating the subscriber DB of the SMC of the private wireless communication system when a registration message related to power-off is received from the MS.

FIG. 6 is a flowchart illustrating a method for updating the subscriber DB of the SMC of the private wireless communication system when a registration message related to power-off is received from the MS.

As shown in FIG. 6, in the case of power-off, the MS 110 transmits a registration message related to power-off to the pBSC 130 via the BTS 120 of the private wireless communication system 100' in S301 and S302.

The pBSC 130 updates MS location registration receipt information and MS control status information in the subscriber DB 164*a* of the SMC 160 based upon the registration message from the MS 110, received via the BTS 120, in S303. In this case, MS location registration receipt information is updated as "NO" in the subscriber DB 164*a* of the SMC 160, and MS control status information is updated as "Power-off" in the subscriber DB 164*a* of the SMC 160.

As a result, the operator updates the present status of the MS 110 in order to easily determine the MS control status. For example, when the MS 110 is powered off, subscriber information is updated in the subscriber DB 164*a* of the SMC 160 by setting MS location registration message receipt information to "NO" and MS control status information to "Power-off." In addition, if it is determined that the MS 110 is located in a shadow area (gap) and thus out of control (Out of Ctrl), the pBSC 130 updates such information (Out of Ctrl) in the subscriber DB 164a of the SMC 160 according to a process the same as above.

A method for storing and managing alarm information in the alarm log DB 164b of the SMC 160, in which alarm information occurs during message transmission from the private wireless communication system 100 to the MS 110, will now be described.

Figure 7:
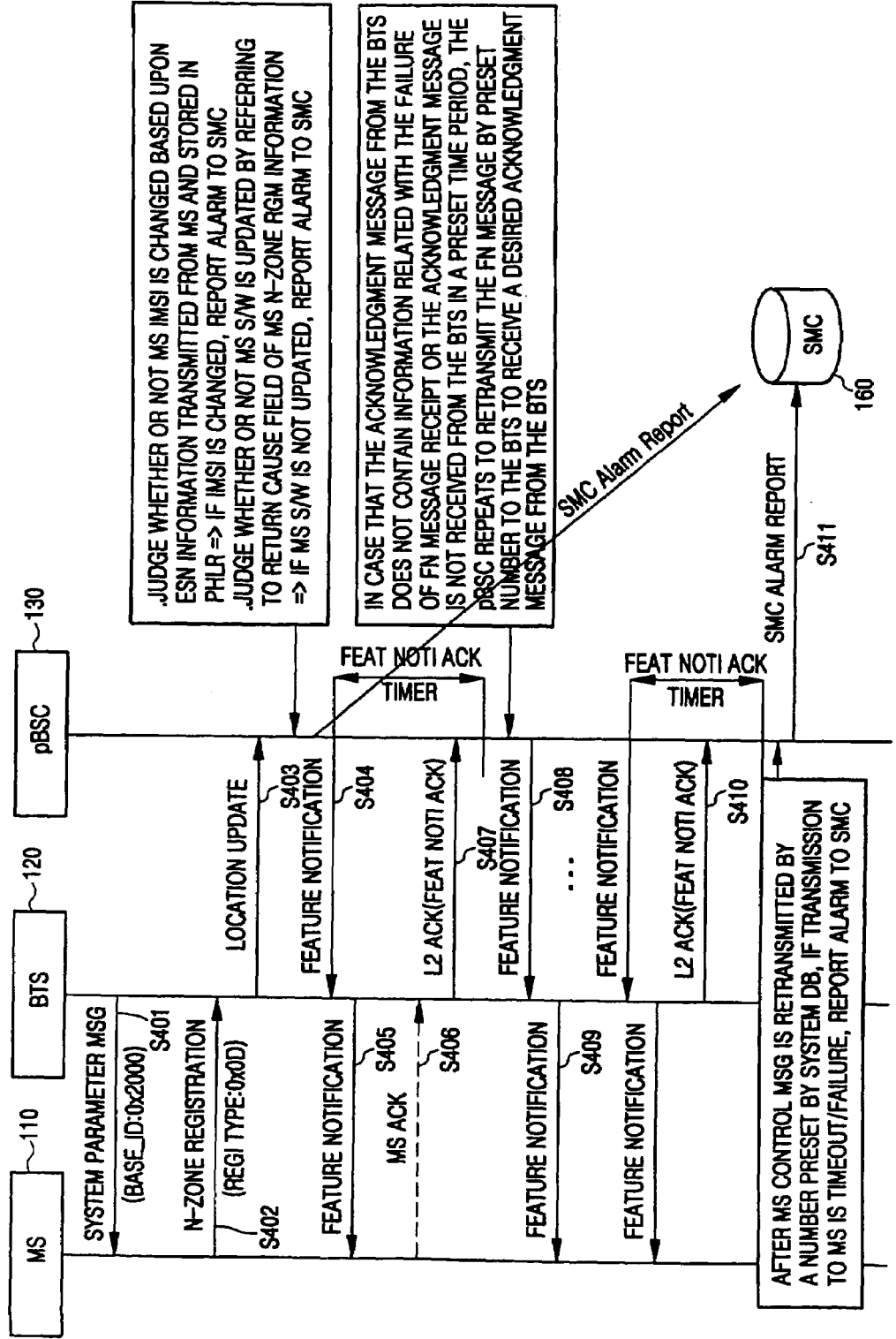
FIG. 7 is a flowchart illustrating a process of reporting alarm information to the alarm log DB wherein alarm information occurs during the transmission of an MS control message (FN message) from the private wireless communication system to the MS.

FIG. 7 is a flowchart illustrating a process of reporting alarm information to the alarm log DB wherein alarm information occurs during the transmission of an MS control message (FN message) from the private wireless communication system to the MS.

As shown in FIG. 7, first, the private wireless communication system 100' transmits a system parameter message to the MS 110 via the BTS 120, informing the MS 110 of its entrance into a service area of the private wireless communication system 100' in S401. Then, in S402, the MS 110 transmits an N-zone registration message, as its location registration message, to the BTS 120 of the private wireless communication system 100'. The N-zone registration message is transmitted from the MS 110 to the private wireless communication system 100' by adding IMSI information and S/W upgrade information to a Return Cause field, in which IMSI information is a unique number necessary for determining whether or not the MS 110 is registered, and S/W upgrade information is used by the private wireless communication system 100' to determine whether or not any software for controlling a corresponding security function of the MS 110 by using an FN message is upgraded.

The BTS 120 provides the location registration message received from the MS 110 to the pBSC 130 in S203.

The pBSC 130 searches the subscriber DB of the pHLR 140 by using an ESN value contained in the location registration message transmitted by the MS 110. In this case, the pBSC 130 can compare an IMSI value of the MS 110, contained in the N-zone registration message from the MS 110, with an IMSI value stored in the subscriber DB of the pHLR 140 in order to determine whether the number of the MS 110 has been intentionally changed by the MS 110.

If the MS number is changed, the pBSC 130 stores and manages the IMSI change information of the MS 110 in the alarm log DB 164b of the SMC 160, and subsequent operation flow does not proceed owing to subscriber information error.

In the case of transmitting the N-zone registration message to the pBSC 130 via the BTS 120 of the private wireless communication system 100', the MS 110 is required to newly designate a specific value so that the pBSC 130 of the private wireless communication system 100' can determine whether the MS 110 has been upgraded with software. That is, the MS 110 designates a Return Cause field with S/W upgrade information concerning whether or not the MS 110 is upgraded with software for controlling a corresponding function of the MS 110 according to an FN message transmitted by the private wireless communication system 100', and transmits the Return Cause field to the private wireless communication system 100'.

When a Return Cause Field value of the N-zone registration message from the MS 110 is analyzed, if the specific value is not designated in the corresponding field, the pBSC 130 of the private wireless communication system 100' determines that the MS 110 is not upgraded with software, and stores/manages corresponding alarm information in the alarm log DB 164b of the SMC 160.

If the MS-controlling software is not upgraded in the MS 110, control information related to MS control is not added to an FN message transmitted thereafter to the MS 110, the MS 110 is not requested to transmit an acknowledgment message in response to the FN message, and FN message retransmission is not performed.

If software upgrade information is designated by a specific value in the Return Cause Field of the N-zone registration message received from the MS 110, the pBSC 130 updates subscriber information in the subscriber DB 164b of the SMC 160, writes an FN message for controlling a security-related function of the MS 110, and then transmits the FN message to the MS 110 via the BTS 120 in S404 and S405.

The MS 110 controls a corresponding function according to the FN message from the private wireless communication system 100', and transmits an acknowledgment message in response to the FN message to the pBSC 130 via the BTS 120 in S406 and S407.

If the acknowledgment message from the MS 110 does not contain information related to failure of FN message receipt, or the acknowledgment message is not received from the MS 110 within a preset time period, the pBSC 130 retransmits the FN message to the MS 110 a preset number of times so as to receive a desired acknowledgment message from the MS 110 in S408, S409 and S410.

After the FN message is retransmitted the preset number of times, if the acknowledgment message in response to the FN message is not received from the MS 110, that is, FN message retransmission fails, the pBSC 130 stores and manages alarm information related to FN message transmission failure in the alarm log DB 164b of the SMC 160 in S411.

As a result, when transmitting the FN message containing MS control information to the MS 110, the pBSC 130 of the private wireless communication system 100' can determine the receipt time of the acknowledgment message in response to the FN message and the number of retransmissions. According to acknowledgment message receipt or transmission failure in response to the transmission of the FN message to the MS 110, the BTS 120 provides alarm information to the pBSC 130, which stores and manages alarm information in the alarm log DB 164b of the SMC 160.

An SMS server (not shown) may be provided in the private wireless communication system 100' in order to provide an alarm message relative to alarm information to the MS 110 as an additional service. That is, when the first daemon 162 of the SMC 160 receives alarm information from the pBSC 130, with reference to the Cause Field value and MIN/extension number of the MS 110 in the received alarm message, it is possible to request alarm message transmission from the SMS server to the MS 110.

As described above, in a situation in which all alarm information occurring during the update of subscriber information and the transmission of the FN message is stored/managed in the subscriber DB 164a and the alarm log DB 164b of the SMC 160, when an operator of the operator system 170 requests corresponding information from the web server 165, the web server 165 searches the DBs 164a and 164b for corresponding information in response to the operator's request, and provides searched information according to subscribers or alarm types.

A method for searching for various alarm information and updated subscriber information via the operator system 170 will be described in more detail with reference to FIGS. 8 and 9.

Figure 8:
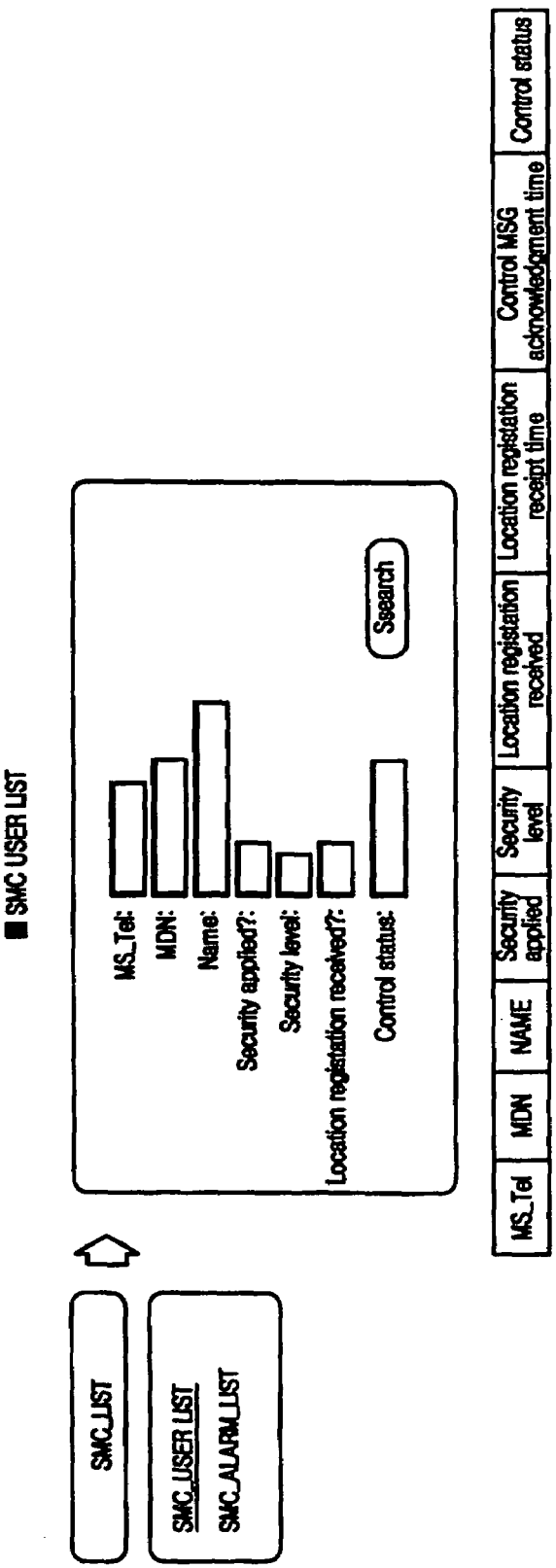
FIG. 8 is an illustration of a subscriber DB management window of an SMC displayed on an operator management system according to the second embodiment of the invention.
Figure 9:
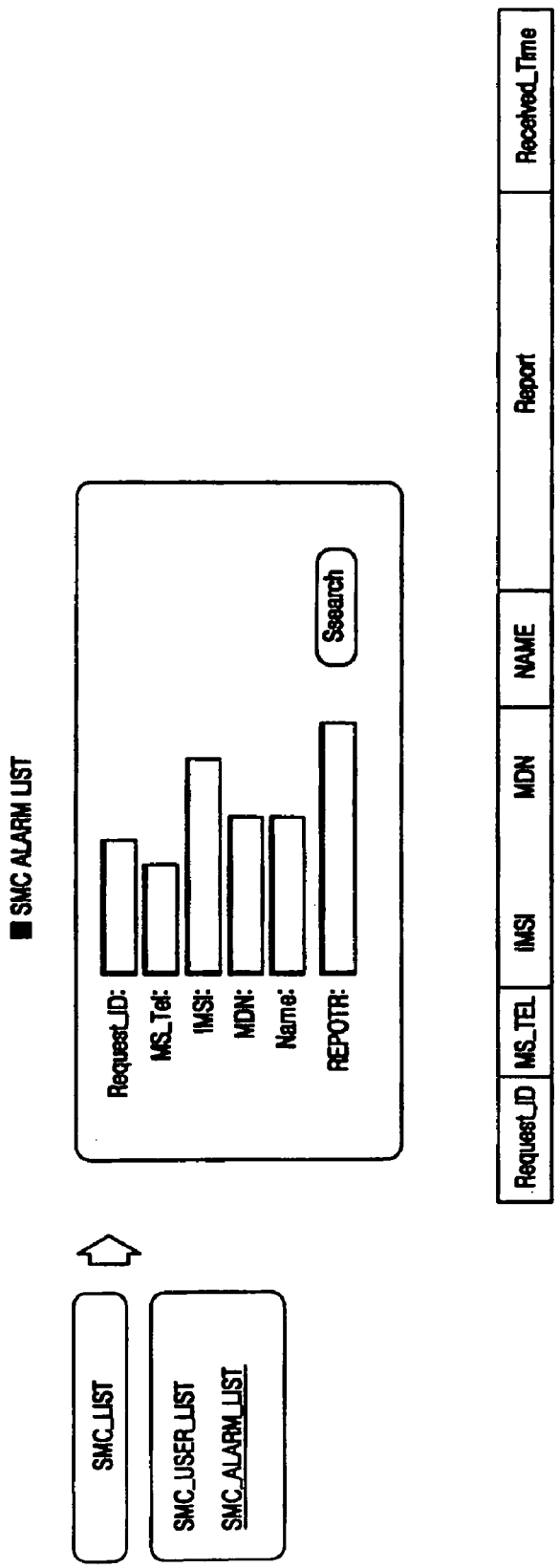
FIG. 9 is an illustration of an alarm load DB management window of an SMC displayed on an operator management system according to the second embodiment of the invention.

FIG. 8 is an illustration of a subscriber DB management window of an SMC displayed on an operator management system according to the second embodiment of the invention, and FIG. 9 is an illustration of an alarm load DB management window of an SMC displayed on an operator management system according to the second embodiment of the invention.

First, when the operator accesses the web server 165 via the operator system 170, the web server 165 provides the operator system 170 with information for searching/managing subscriber and alarm information, thereby displaying a window as shown in FIGS. 8 and 9.

That is, selection windows as shown in FIGS. 8 and 9 are provided so that the operator can search for subscriber and alarm list information.

When the operator selects, for example, "SMC_USER-LIST" from a provided window in order to search for updated subscriber information, a window for allowing a subscriber information search as shown in FIG. 8 is displayed. In this case, input fields for subscriber list search may include a subscriber telephone number input field (MS_Tel), a subscriber name field, a security applicability input field, security level input field, location registration message receipt input field, and an MS present control status input field.

When displayed as in FIG. 8, the operator sends a request message for corresponding subscriber information to the web server 165 via the Internet by inputting search information into each field.

In response to the request of the operator system 170, the web server 165 searches for corresponding subscriber information in the subscriber server 164a and transmits corresponding subscriber information to the operator system 170. In this case, subscriber information displayed on the operator system 170 may include MS telephone number information, MDN information, subscriber name information, security applicability information, security level information, location registration message receipt information, location registration message receipt time information, FN acknowledgment message receipt time information, and MS control status information.

As a result, the operator can easily confirm and manage web-based information, which is updated according to subscribers.

When the operator selects "SMC_ALARM_LIST" from the window shown in FIG. 8 in order to confirm alarm information, the web server 165 provides a window as shown in FIG. 9 to the operator system 170 so that the operator system 170 displays the window.

Search request fields displayed via the operator system 170 may include an MS telephone number input field, an MS IMSI information input field, an MDN input field, and a REPORT input field, where subscriber name information and alarm type are to be inputted.

When the operator sends a request message to the web server 165 of the SMC 160 by inputting corresponding subscriber information to be searched, the web server 165 searches the alarm log DB 164b for corresponding information in response to the request of the operator system 170, and provides corresponding information to the operator system 170, which then displays the corresponding information.

Information displayed via the operator system 170 as a result of the search may include at least one of MS telephone number information, MS IMSI information, MDN information, subscriber name information, alarm report information, FN acknowledgment receipt time information, and MS control status information, as shown in FIG. 9.

While the first and second embodiments of the present invention have been described with respect to CDMA IS-95, it is to be understood by those skilled in the art that the foregoing embodiments can be applied equivalently to other specifications of GSM, WCDMA, CDMA2000.

According to the private wireless communication system and the MS control method using the same of the present invention, the private wireless communication system informs an MS of its entrance into a private network using a system parameter message broadcast through a paging channel in order to control additional functions of the MS (e.g., a camera function, an MP3 player function and a USB data communication function), and the MS transmits a registration message to the private wireless communication system through an access channel. The private wireless communication system can determine whether the MS is registered in the private network based upon the registration message from the MS, and if the MS is determined to be registered in the private network, can control the functions of the MS by writing a message for MS function control based upon MS control information set in the DB, and by transmitting the MS function control message to the MS. After the private wireless communication system has requested an acknowledgment message from the MS by transmitting the MS function control message containing MS control information to the MS, if the acknowledgment message is not received from the MS, the private wireless communication system rewrites and retransmits the MS function control message to the MS so as to control MS functions.

As a result, in a company, a government organization and various public places (e.g., a theatre, a concert site, a lecture room or a conference hall), where information security is required, it is possible to control MS functions to prevent information leakage via the MS by using the private network.

Furthermore, it is possible to control MS functions in a corresponding private area without having to affect other users' MSs located outside the private area. With the retransmission flow for an MS function control message, a more reliable MS control process can be realized.

In addition, since result report values concerning the transmission of the MS function control message are sent to, and collected by, the subscriber DB of the pHLR or the SMC separately connected to the operator system, there are advantageous effects in that the result values can be used as statistical sources by the operator facilitating management. That is, the SMC is connected to the operator system via the Internet so as to provide web tools cooperating with the system, thereby actively affording desired subscriber update information and alarm information occurring during the MS control flow in response to the requirements of the operator. As a result, this can improve the reliability and convenience of security management.

While the present invention has been shown and described in connection with preferred embodiments, it will be apparent to those skilled in the art that modifications and variations can be made without departing from the spirit and scope of the invention as defined by the appended claims.

What is claimed is:

1. A method for controlling a mobile station by using a private wireless communication system, the method comprising the steps of:

when a mobile station registered in the private wireless communication system enters a service area of the private wireless communication system, enabling a control unit of the private wireless communication system to write a function control message for controlling a plurality of functions of the mobile station, with the function control message determining an enabled status and a disabled status of the plurality of functions of the mobile station, and transmitting the function control message from the control unit to the mobile station; and controlling, at the mobile station, the enabled status and disabled status of at least one of the plurality of functions of the mobile station by analyzing a system parameter message indicating a location of the mobile station with respect to the private wireless communication system, and by simultaneously analyzing the function control message transmitted from the private wireless communication system, the system parameter message being broadcast by the private wireless communication system to the mobile station.

2. The method according to claim 1, further comprising the step of, when an acknowledgment message in response to the function control message is not received from the mobile station within a predetermined time period, retransmitting at the control unit of the private wireless communication system the function control message to the mobile terminal via a private wireless network.

3. The method according to claim 1, wherein the function control message comprises a Feature Notification (FN) message in which information for the control of the plurality of functions of the mobile station is added to a predetermined field.

4. The method according to claim 3, further comprising the step of, when the mobile station receives the FN message from the private wireless communication system via the private wireless network, examining the predetermined field value of the FN message, and controlling at least one of the plurality of functions of the mobile station based upon the examined field value of the FN message.

5. The method according to claim 3, wherein the predetermined field of the FN message is an IS-95 information record field.

6. The method according to claim 1, wherein the function control message contains at least one of camera locking control information, MP3 player locking control information, multimedia data communication interfacing control information, and record locking control information.

7. The method according to claim 1, wherein the function control message contains transmission request information for an acknowledgment message in response to the receipt of the function control message.

8. The method according to claim 7, wherein the function control message contains information notifying the mobile station that the mobile station has entered the service area of the private wireless communication system where a private wireless communication service is available.

9. The method according to claim 1, further comprising the step of, when an acknowledgment message in response to the function control message is not received from the mobile station within at predetermined time period, storing and managing a report value according to one of transmission success and transmission failure of the function control message.

10. The method according to claim 9, wherein the report value contains at least one of IMSI information registered in a pHLR of the private wireless communication system, ESN information of the mobile station, IMSI information transmitted from the mobile station, software applicability information for control of the plurality of functions of the mobile station, result information according to one of transmission success and transmission failure of the function control message, present status information of the mobile terminal, and receipt time information of the acknowledgment message in response to the function control message.

11. The method according to claim 10, wherein the report value is stored and managed in a database of one of a pHLR and an additional outside Security Management Center (SMC) server.

12. The method according to claim 1, further comprising the steps of locking a corresponding function of the mobile station according to the function control message transmitted from the private wireless communication system, and upon receiving a message informing that the mobile station moves out of the service area of the private wireless communication system, unlocking and restoring the locked function of the mobile station.

13. A method for controlling a mobile station in a private wireless communication system, the method comprising the steps of:
when a mobile station registered in the private communication system enters a service area of the private wireless communication system, broadcasting a system parameter message, from the private wireless communication system to the mobile station, in order to report the entrance of the mobile station, and receiving a location registration message including a predetermined registration type from the mobile station;
updating location information of the mobile station based upon the location registration message received from the mobile station, enabling a control unit to write an FN (feature notification) message containing information for controlling an enabled status and a disabled status of at least one function of the mobile station, and transmitting the FN message to the mobile station; and
determining, at the mobile station, the enabled status and the disabled status of a corresponding function of the mobile station by analyzing the FN message received from the control unit of the private wireless communication system and by simultaneously analyzing the system parameter message indicating location of the mobile station with respect to the private wireless communication system, and transmitting an acknowledgment message to the control unit of the private wireless communication system in response to the reception of the FN message.

14. The method according to claim 13, further comprising the step of, when the acknowledgment message in response to the function control message is not received from the mobile station within a predetermined time period, retransmitting at the private wireless communication system the function control message to the mobile terminal.

15. A method for controlling a mobile station by using a private wireless communication system, the method comprising the steps of:
when a mobile station registered in the private wireless communication system enters a service area of the private wireless communication system, transmitting a system parameter message to the mobile station to report entrance;
when an N-zone registration message is received from the mobile station in response to the system parameter message, storing and managing detailed subscriber station information in a separate external SMC server, and writing at the private wireless communication system an FN message for control of corresponding functions of the mobile station, and transmitting the FN message to the mobile station via a private wireless network; and
receiving an acknowledgment message from the mobile station in response to the FN message, storing alarm information contained in the acknowledgment message in the external SMC server, the alarm information being generated in accordance with a transmission result of the FN message with the transmission result representing whether the transmission of the FN message is successful, and when an operator system requests at least one of subscriber information and the alarm information, providing corresponding information to the operator system.

16. The method according to claim 15, wherein the N-zone registration message from the mobile station contains upgrade information for software which enables control over a corresponding function according to the FN message from the private wireless communication system.

17. The method according to claim 16, wherein the upgrade information is transmitted to the private wireless communication system by setting a specific value in a return cause field of the N-zone registration message.

18. The method according to claim 15, wherein the operator system is connected to the SMC server via an IP network.

19. A control unit of a private wireless communication system, comprising:
- a first stage responsive to a mobile station registered in the private wireless communication system entering a private wireless communication service area of a mobile public network for writing a function control message for controlling functions of the mobile station, and for transmitting the function control message to the mobile station via a private wireless network, with the function control message determining an enabled status and a disabled status of multiple multimedia data processing functions of the mobile station and the function control message having multiple function control fields for respectively controlling the multiple multimedia data processing functions of the mobile station; and
- a second stage responsive to an acknowledgment message not being received from the mobile station in response to the reception of the function control message within a predetermined time period, for retransmitting the function control message to the mobile station to control at least one of the multimedia data processing functions of the mobile station.

20. The control unit according to claim 19, with the function control message containing at least one of camera locking control information, MP3 player locking control information, multimedia data communication interfacing control information, and record locking control information.

21. The control unit according to claim 19, further comprising a statistics/management unit responsive to an acknowledgment message not being received from the mobile station in response to the reception of the function control message within a predetermined time period for storing and managing a report value according to one of transmission success and transmission failure of the function control message, and subscriber information for the mobile station.

22. A private wireless communication system, comprising:
- a mobile station which, upon entering a service area of a specific private wireless communication network, transmits a location registration message in response to a system parameter message reporting the entrance of the mobile station into the service area, controls at least one function in accordance with a function control message received in response to the location registration message with the function control message determining an enabled status and a disabled status of the at least one function of the mobile station and simultaneously in accordance with the system parameter message indicating location of the mobile station with respect to the service area, and transmits an acknowledgment message in response to receipt of the function control message; and
- a private wireless communication unit which broadcasts the system parameter message to the mobile station in response to the entrance of the mobile station into the service area of the private wireless communication network, and writes and transmits the function control message for selective control of said at least one function of the mobile station in response to the location registration message.

23. The private wireless communication system according to claim 22, wherein the private wireless communication unit comprises:
- a pHLR for upgrading and storing subscriber information of mobile stations relating to at least one of additional registration, deletion, location and status change of each mobile station;
- a pBSC for writing the function control message for the control of said each mobile station when said each mobile station enters a service area of the private wireless communication system, for transmitting the function control message to said each mobile station, and for upgrading subscriber information and processing alarm information in response to a transmission result of the function control message with the transmission result of the function control message representing whether the transmission of the FN message is successful; and
- an SMC server connected to the pHLR for receiving, from the pHLR, corresponding information according to a change of subscriber information of said each mobile station, and for storing and managing the corresponding information, connected to the pBSC for upgrading and storing the subscriber information according to transmission of the function control message to the mobile station, and for storing and managing alarm information generated according to transmission and receipt of the function control message, and connected to an operator system for providing one of subscriber information and alarm information to the operator system in response to a request from an operator.

24. The private wireless communication system according to claim 23, wherein the SMC server comprises:
- a database for storing the subscriber information and the alarm information of the mobile stations according to one of subscribers and alarm types;
- an information processor connected to the pHLR and to the pBSC for receiving the subscriber information of each mobile station added to and each mobile station deleted from the pHLR so as to upgrade subscriber information stored in the database, and for receiving alarm information processed by the pBSC for storage and management in the database; and
- a web server connected to the operator system via an IP network, and responsive to a request from the operator system for at least one of subscriber information and alarm information for searching the database for requested information for provision to the operator system via the IP network.

25. The private wireless communication system according to claim 23, wherein the private wireless communication unit further comprises a message transmitter responsive to alarm information occurring according to at least one of transmission and receipt of the function control message and an acknowledgment message between the pBSC and said each mobile station for providing a text message to the mobile station informing of the alarm information.

\* \* \* \* \*